(12) United States Patent
Lin

(10) Patent No.: US 9,841,564 B1
(45) Date of Patent: Dec. 12, 2017

(54) WAVELENGTH DIVISION MULTIPLEXING DEVICE

(71) Applicant: HON HAI PRECISION INDUSTRY CO., LTD., New Taipei (TW)

(72) Inventor: Po-Yu Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/491,997

(22) Filed: Apr. 20, 2017

(30) Foreign Application Priority Data

Feb. 24, 2017 (TW) .............................. 106106357 A

(51) Int. Cl.
*G02B 6/28* (2006.01)
*G02B 6/293* (2006.01)
*G02B 6/34* (2006.01)
*G02B 6/42* (2006.01)
*G02B 6/32* (2006.01)

(52) U.S. Cl.
CPC ....... *G02B 6/29365* (2013.01); *G02B 6/2938* (2013.01); *G02B 6/32* (2013.01); *G02B 6/34* (2013.01); *G02B 6/4206* (2013.01); *G02B 6/4214* (2013.01); *G02B 6/4215* (2013.01); *G02B 6/4239* (2013.01); *G02B 6/4244* (2013.01); *G02B 6/4256* (2013.01)

(58) Field of Classification Search
CPC .... G02B 6/29365; G02B 6/2938; G02B 6/32; G02B 6/34; G02B 6/4206; G02B 6/4214; G02B 6/4215; G02B 6/4239; G02B 6/4244; G02B 6/4256

USPC ............................................... 385/24
See application file for complete search history.

(56) References Cited

U.S. PATENT DOCUMENTS

| | | | |
|---|---|---|---|
| 2006/0029329 A1* | 2/2006 | Takushima | G02B 6/29368 385/33 |
| 2010/0220326 A1* | 9/2010 | Frazier | A61B 5/0059 356/419 |
| 2014/0086532 A1* | 3/2014 | Droesbeke | G02B 6/30 385/39 |
| 2015/0180584 A1* | 6/2015 | Mossberg | G02B 6/2938 398/79 |
| 2016/0165324 A1* | 6/2016 | Zhao | H04J 14/02 398/48 |
| 2016/0170218 A1* | 6/2016 | Johnson | G02B 6/32 359/356 |
| 2017/0045441 A1* | 2/2017 | Nciri | G01J 3/10 |

* cited by examiner

*Primary Examiner* — Jerry Blevins
(74) *Attorney, Agent, or Firm* — ScienBiziP, P.C.

(57) ABSTRACT

A wavelength division multiplexing device with reduced signal loss and lower cost includes a casing, focusing lenses, and light splitters. The casing has walls defining slots. The focusing lenses are in an array. The light splitter includes prisms and filters. Each filter has opposite ends, ends being received in slot of the second sidewall and slot of the fourth sidewall. The prisms are positioned at the bottom plate and correspond to the focusing lenses. Each prism has an inner inclined surface facing the corresponding filter and signal light is selectively refracted and directed, to extract light of a particular wavelength and allow the through transmission of unextracted light towards subsequent light splitters.

8 Claims, 4 Drawing Sheets

WAVELENGTH DIVISION MULTIPLEXING DEVICE

FIELD

The subject matter herein generally relates to wavelength division multiplexing.

BACKGROUND

Wavelength Division Multiplexing (WDM) uses a multiplexer at the transmitter to multiplex a number of optical signals with different wavelengths onto a single optical fiber, and a demultiplexer at the receiver to split them apart.

A WDM receiver usually comprises a collimator, a number of condensing lenses, and a light splitter. The light splitter comprises an array of filters and a mirror. Each filter corresponds to one condensing lens. In operation, a first filter receives incident light collimated by the collimator. Then, the first receiver allows the incident light in a particular wavelength band to penetrate towards the corresponding condensing lens and reflects the incident light in other wavelength bands towards the mirror, so that the incident light can be reflected by the mirror towards a second filter. The second filter performs the similar actions as the first filter, so that the incident light L can finally be split into light of different wavelengths after repeated penetrations and reflections.

However, since the excess incident light is repeatedly reflected by the mirror, the transmission distance and the transmission time period of the excess incident light increase, which may increase the optical loss. Optical loss of excess incident light at the last channel reaches a maximum value, which decreases the transmission efficiency of the WDM receiver.

BRIEF DESCRIPTION OF THE DRAWINGS

Implementations of the present technology will now be described, by way of example only, with reference to the attached figures.

DETAILED DESCRIPTION

Figure 1:
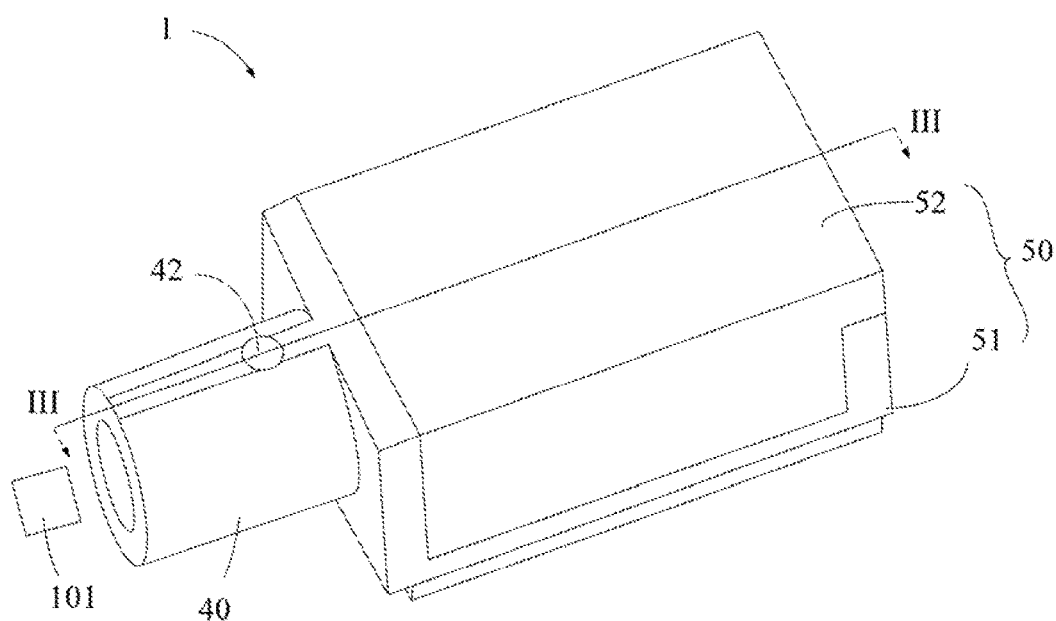
FIG. 1 is a diagrammatic view of an exemplary embodiment of a WDM device.
Figure 2:
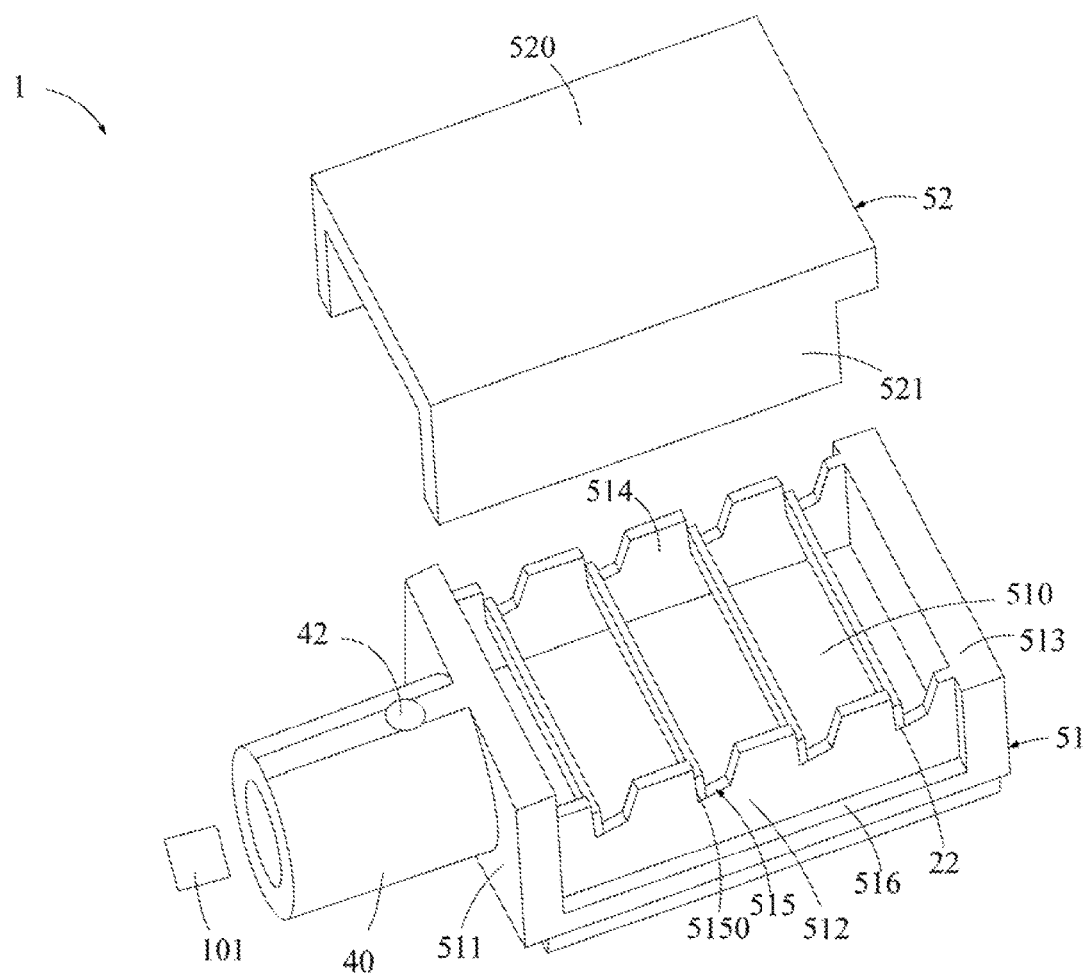
FIG. 2 is a diagrammatic view showing an upper cover being separated from the WDM device of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1-4 illustrate an exemplary embodiment of a wavelength division multiplexing (WDM) device 1 comprising a collimating lens 10, a light splitter 20, a number of focusing lenses 30, a sleeve 40, and a casing 50.

The sleeve 40 is substantially a hollow cylinder, and comprises an outer circumferential surface 43 and a receiving hole 41 surrounded by the outer circumferential surface 43. The receiving hole 41 receives an optical fiber 100. When the WDM device 1 function as a WDM receiver, the optical fiber 100 is aligned with a laser diode 101, and can receive incident light emitted by the laser diode 101 (see FIGS. 1-3). When the WDM device 1 function as a WDM transmitter, the optical fiber 100 is aligned with a photodiode 200, and can transmit incident light to the photodiode 102 (see FIG. 4). In at least one exemplary embodiment, the outer circumferential surface 43 defines at least one through hole 42 communicating with the receiving hole 41. The through hole 42 can allow adhesive to be injected into the receiving hole 41, so that the optical fiber 100 can be fixed adhesively in the receiving hole 41. In at least one exemplary embodiment, the optical fiber 100 is a multimode optical fiber having an improved transmission efficiency.

The casing 50 is mounted to an end of the sleeve 40. The casing 50 comprises a base 51 and an upper cover 52 engaged with the base 51.

The base 51 comprises a substantially rectangular bottom plate 510 and a first sidewall 511, a second sidewall 512, a third sidewall 513, and a fourth sidewall 514 positioned on the bottom plate 510 and connected in that order. The first sidewall 511 faces the third sidewall 513. The second sidewall 512 faces the fourth sidewall 514. The first sidewall 511 covers an end of the receiving hole 41. The collimating lens 10 is formed at a surface of the first sidewall 511 facing the receiving hole 41, and is aligned with the optical fiber 100. The focusing lenses 30 are formed under the bottom plate 510. The focusing lenses 30 are arranged in an array along an extending direction of the second sidewall 512 and the fourth sidewall 514, and are spaced from each other. When the WDM device 1 function as a WDM receiver, each focusing lens 30 is aligned with one photodiode 200 (see FIG. 3). When the WDM device 1 function as a WDM transmitter, each focusing lens 30 is aligned with one laser diode 201 (see FIG. 4). In at least one exemplary embodiment, the base 21 comprises a receiving space 517 at a surface of the bottom plate 510 facing away from the first sidewall 511, the second sidewall 512, the third sidewall 513, and the fourth sidewall 514. The photodiodes 200 are received in the receiving space 517.

Each of the second sidewall 512 and the fourth sidewall 514 defines a number of slots 512. The slots 512 do not pass through the second sidewall 512 and the fourth sidewall 514, that is, bottoms of the slots 512 are positioned above the bottom plate 510. The slots 512 of the second sidewall 512 respectively correspond to the slots 512 of the fourth sidewall 514. In at least one exemplary embodiment, the slots 512 of the second sidewall 512 are spaced from each other, and the slots 512 of the fourth sidewall 514 are spaced from each other.

The light splitter 20 comprises a number of prisms 21 and a number of filters 22. Each filter 22 is substantially stripshaped, and comprises two opposite ends received in two slots 512 of the second sidewall 512 and the fourth sidewall 514, so that the filters 22 are supported by the second sidewall 512 and the fourth sidewall 514. The filters 22 are arranged in an array along an extending direction of the second sidewall 512 and the fourth sidewall 514. Each filter 22 can allow penetration of incident light in a particular wavelength band and reflect incident light in other wavelength bands. In at least one exemplary embodiment, each slot 515 is substantially V-shaped, and comprises an inner wall 5150 positioned close to the first sidewall 511. The two ends of each filter 22 are attached to the inner walls 5150 of the slots 512. In at least one exemplary embodiment, the filters 22 can be fixed in the slots 512 by adhesive.

The prisms 21 are positioned at a surface of the bottom plate 510 facing away from the focusing lenses 30 and correspond to the focusing lenses 30. Each prism 21 comprises an inner inclined surface 210 facing one filter 22. A normal of each filter 22 has a predetermined inclined angle in relation to the incident light which strikes the filter 22. As such, When the WDM device 1 function as a WDM receiver, the filter 22 can allow penetration of incident light in a particular wavelength band towards a next filter 22 and reflect incident light in other wavelength bands towards the corresponding prism 21. The inner inclined surface 210 of the prism 21 reflects the incident light towards the corresponding focusing lens 30. The focusing lens 30 focuses the incident light to the corresponding photodiode 200 (see FIG. 3). When the WDM device 1 function as a WDM transmitter, each focusing lens 30 focuses the incident light emitted by the laser diode 201 to the corresponding prism 21. The inner inclined surface 210 of the prism 21 reflects the incident light towards the corresponding filter 22. The filter 22 can reflect the incident light towards the previous filter 22 close to the optical fiber 100, so that the previous filter 22 can allow penetration of incident light towards the optical fiber 100 (see FIG. 4).

In at least one exemplary embodiment, the predetermined inclined angle is about 15 degrees. Each prism 21 has a cross section of an equilateral triangle, that is, an angle defined by the inner inclined surface 210 and the bottom plate 510 is of about 60 degrees. Thus, the prism 21 can reflect the incident light straight downwards to the corresponding focusing lenses 30.

In at least one exemplary embodiment, the number of the filters 22 is four, the number of the prisms 21 is four, and the number of the focusing lenses 30 is four. That is, the WDM device 1 has 1×4 channels when functioned as the WDM receiver, and has 4×1 channels when functioned as the WDM transmitter.

In at least one exemplary embodiment, the laser diodes 101, 201 and the photodiodes 200, 201 have a low operation wavelength of about 850 nm to about 940 nm. The WDM device 1 operates under four wavelengths, that is, 850 nm, 880 nm, 910 nm, and 940 nm. That is, the WDM device 1 is a short wavelength division multiplexing (SWDM) device having a lower manufacturing cost.

The upper cover 52, when engaged with the base 51, can encapsulate the base 51 and prevent dust from entering the base 51. In at least one exemplary embodiment, the upper cover 52 comprises an upper plate 520 and two outer sidewalls 521 perpendicularly extending from two opposite sides of the upper plate 520. The second sidewall 512 and the fourth sidewall 514 are recessed towards a center of the base 51, so that the second sidewall 512, the fourth sidewall 514, and the bottom plate 510 can cooperatively form two stepped portions 516. When the base 51 and the upper cover 52 are engaged, the outer sidewalls 521 abut against the stepped portions 516, thereby encapsulating the base 51.

Figure 3:
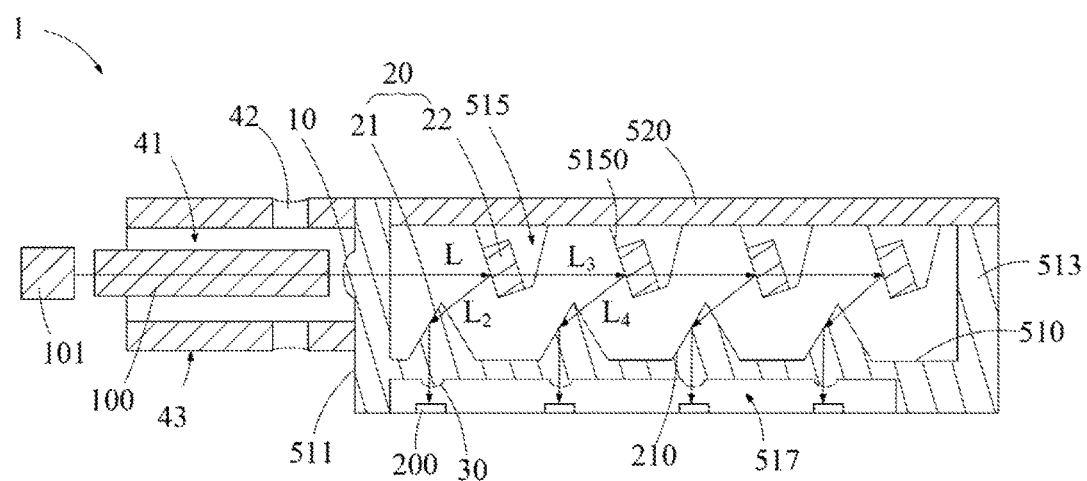
FIG. 3 is a cross-sectional view of the WDM device taken along line of FIG. 1.

Referring to FIG. 3, when the incident light L emitted by the laser diode 101 enters the collimating lens 10 through the optical fiber 100, the collimating lens 10 collimates the incident light towards the filter 22 adjacent to the first sidewall 511 (hereinafter, "first filter 22"). The first filter 22 allows penetration of the incident light in a particular wavelength band (hereinafter, "incident light $L_1$") towards the next filter 22 (hereinafter, "second filter 22"), and reflects all other incident light (hereinafter, "incident light $L_2$") towards the corresponding prism 22, so that the prism 21 reflects the incident light $L_2$ to the corresponding focusing lens 30. The second filter 22 allows penetration of the incident light in a particular wavelength band (hereinafter, "incident light $L_3$") towards the next filter 22 and reflects the other incident light (hereinafter, "incident light $L_4$") towards the corresponding prism 22, so that the prism 21 reflects the incident light $L_4$ to the corresponding focusing lens 30. After repeated penetrations and reflections, the incident light L can be separated to a number of beams of light with different wavelengths.

Figure 4:
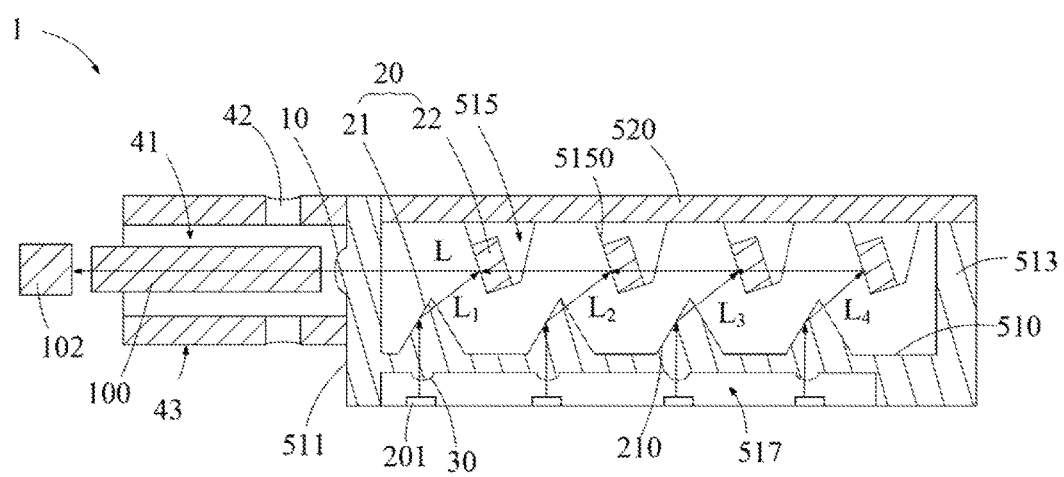
FIG. 4 is similar to FIG. 3, but showing another exemplary embodiment of a WDM device.

Referring to FIG. 4, when the incident light $L_1$, $L_2$, $L_3$, and $L_4$ emitted by the laser diodes 201 enters the focusing lenses 30, the focusing lenses 30 focus the incident light $L_1$, $L_2$, $L_3$, and $L_4$ towards the prisms 22. The prisms 22 reflect the incident light $L_1$ towards the optical fiber 100 and the incident light $L_2$, $L_3$, and $L_4$ towards the previous filters 22 close to the optical fiber 100, so that the previous filters 22 allows penetration of the incident light $L_2$, $L_3$, and $L_4$ towards the optical fibers 100. Thus, the separated incident light $L_1$, $L_2$, $L_3$, and $L_4$ can be combined into a single beam of light.

When the WDM device 1 function as a WDM receiver, the prisms 21 can directly reflect the incident light to the focusing lenses 30, which focus the incident light to the photodiodes 200. When the WDM device 1 function as a WDM transmitter, the prisms 21 can directly reflect the incident light to the filters 22, which allows penetration of the incident light towards the optical fiber 100. Therefore, the transmission distance and the transmission time period of the incident light are decreased, thereby decreasing the optical loss and improving the transmission efficiency of the WDM device 1.

Even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A wavelength division multiplexing device comprising:
   a casing having a base, the base having a bottom plate and a first sidewall, a second sidewall, a third sidewall, and a fourth sidewall positioned on the bottom plate and connected in that order, each of the second sidewall and the fourth sidewall defining a plurality of slots, each of the plurality of slots of the second sidewall corresponding to one of the plurality of slots of the fourth sidewall, the casing further comprising an upper cover engaged with the base for encapsulating the base, wherein the upper cover comprises an upper plate and two outer sidewalls perpendicularly extending from two opposite sides of the upper plate, the second sidewall and the fourth sidewall are recessed towards a center of the base, so that the second sidewall, the fourth sidewall, and the bottom plate cooperatively form two stepped portions, the outer sidewalls abut against the stepped portions when the base and the upper cover are engaged, thereby encapsulating the base;

a plurality of focusing lenses formed under the bottom plate, the plurality of focusing lenses arranged in an array along an extending direction of the second sidewall and the fourth sidewall; and a light splitter comprising a plurality of prisms and a plurality of filters, each of the plurality of filters having two opposite ends received in two of the plurality of slots, corresponding to each other, of the second sidewall and the fourth sidewall, so that the plurality of filters is supported by the second sidewall and the fourth sidewall and arranged in an array along the extending direction of the second sidewall and the fourth sidewall, the plurality of prisms positioned at a surface of the bottom plate facing away from the plurality of focusing lenses and corresponding to the plurality of focusing lenses, each of the plurality of prisms having an inner inclined surface facing one corresponding filter for receiving incident light or reflecting incident light to the filter, a normal of each of the plurality of filters having a predetermined inclined angle in relation to the incident light which strikes the plurality of filters.

2. The wavelength division multiplexing device of claim 1, wherein each of the plurality of slots is V-shaped and comprises an inner wall positioned close to the first sidewall; the two ends of each of the plurality of filters are attached to the inner walls of the two of the plurality of slots.

3. The wavelength division multiplexing device of claim 2, wherein the plurality of filters is fixed in the plurality of slots by adhesive.

4. The wavelength division multiplexing device of claim 1, wherein the predetermined inclined angle is of 15 degrees; each of the plurality of prisms has a cross section of an equilateral triangle, to cause an angle defined by the inner inclined surface and the bottom plate is of 60 degrees.

5. The wavelength division multiplexing device of claim 1, wherein the wavelength division multiplexing device is a short wavelength division multiplexing device operating under 850 nm, 880 nm, 910 nm, and 940 nm.

6. The wavelength division multiplexing device of claim 1, further comprising a collimating lens and a sleeve, wherein the casing is mounted to an end of the sleeve; the sleeve defines a receiving hole for receiving an optical fiber; the first sidewall covers an end of the receiving hole; the collimating lens is formed at a surface of the first sidewall facing the receiving hole and is aligned with the optical fiber.

7. The wavelength division multiplexing device of claim 6, wherein the sleeve further comprising an outer circumferential surface surrounding the receiving hole; the outer circumferential surface defines at least one through hole communicating with the receiving hole; the through hole cans allow adhesive to be injected into the receiving hole.

8. The wavelength division multiplexing device of claim 1, wherein the plurality of focusing lenses corresponds to a plurality of light emitting diodes; the base comprises a receiving space at a surface of the bottom plate facing away from the first sidewall, the second sidewall, the third sidewall, and the fourth sidewall; the light emitting diodes are received in the receiving space.

* * * * *